H. BESSER.
TIRE FOR VEHICLES.
APPLICATION FILED OCT. 16, 1914.

1,150,986.

Patented Aug. 24, 1915.

WITNESSES:

Herman Besser  INVENTOR

BY

Geo. B. Willcox  ATTORNEY

UNITED STATES PATENT OFFICE.

HERMAN BESSER, OF ALPENA, MICHIGAN.

TIRE FOR VEHICLES.

1,150,986. Specification of Letters Patent. Patented Aug. 24, 1915.

Application filed October 16, 1914. Serial No. 866,912.

*To all whom it may concern:*

Be it known that I, HERMAN BESSER, a citizen of the United States, residing at Alpena, in the county of Alpena and State of Michigan, have invented certain new and useful Improvements in Tires for Vehicles; and I do hereby declare the following to be a full, clear, and exact description of the invention, such as will enable others skilled in the art to which it appertains to make and use the same.

This invention relates to vehicle tires and pertains more particularly to cushioned tires for use on automobiles, trucks, and similar vehicles.

The objects of the invention are, first, to provide a tire that is simple in construction, composed of but few parts, all of which can be readily removed and replaced with new parts when worn.

A further object is to provide a tire of the so-called solid type, as distinguished from pneumatic tires, the amount of resilience of the solid tire being adjustable, or controlled by mechanical means comprised in the tire construction.

A still further object is to provide a tire of the type above described, in which provision is made for a proper degree of lateral yielding as well as yielding in a vertical direction when the tire is under load.

With these and certain other objects in view which will appear later in the specification, my invention consists in the devices described and claimed and the equivalents thereof.

Figure 1:
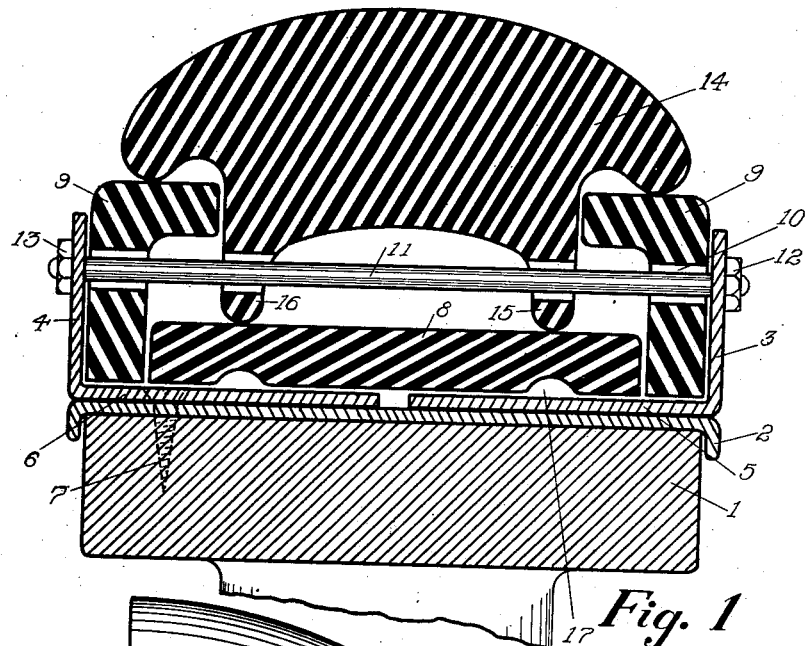
Figure 2:
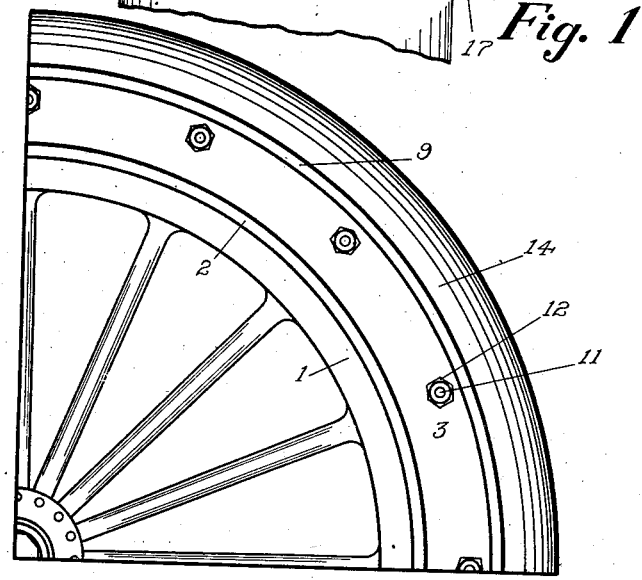

In the drawings, Figure 1 is an enlarged cross section through the tire and rim of a vehicle wheel. Fig. 2 is a side elevation of part of a vehicle wheel with my improved tire attached.

As is clearly shown in the drawings, 1 represents the felly of the vehicle wheel, to which is secured in any suitable manner a metal rim 2, upon which the tire is mounted. The resilient members of the tire are mounted within a pair of circular flanges 3 and 4 of angular cross section, the upright flanges being practically parallel with the sides of the felly 1 and the horizontal flanges 5, 6 bearing upon the metal rim 2 as shown in Fig. 1. The horizontal member of one of the circular flanges, as 6, may be secured to the metal rim 2 in any suitable manner, as by a screw 7 or otherwise.

An inner circular rim 8 of rubber or other resilient material rests upon the horizontal members 5 and 6 of flanges 3 and 4, extending clear around the circumference of the wheel, but occupying only part of the width of the felly.

At each side of the rim 8 is an annular cushion of L-shaped cross section 9, the outer surface of which bears against the inner surface of the circular flange 3 or 4. The cushions 9 are provided with openings 10, through which loosely pass bolts 11, upon the ends of which are adjusting nuts 12 and 13.

The outer or main cushion member 14 is received between the inwardly projecting flanges of the annular cushion 9 and rests upon the face of the cushion rim 8, as shown in Fig. 1. The main cushion member 14 is provided with two downwardly projecting rims 15 and 16, which are apertured to loosely receive the bolts 11, and the lateral edges of the main cushion member 14 are curved downwardly to rest upon the upper or outer surfaces of the annular cushions 9.

The inner face of cushion rim 8 is preferably formed with annular grooves or recesses 17 directly beneath the bearing points of the downwardly projecting rims 15 and 16.

As is clearly shown in the drawings, the recessed inner surface of the main cushion member 14, being that part lying between the downwardly projecting rims 15 and 16, imparts a considerable degree of resilience to the tread of the main cushion member 14, while the main load or impact of the member 14 upon the road is transmitted through the rims 15, 16 to that part of the inner circular rim 8 which lies directly over the annular grooves 17, these grooves serving to impart additional resilience to the rim 8 at those parts of the rim upon which the load is received.

Part of the load upon the main cushion member 14 is also distributed through its laterally extending edges to the outer faces of the annular cushions 9. The inwardly projecting flanges of the cushions 9 take against the sides of the main cushion member and when drawn tight by means of the nuts on the bolts 11, the inner ends of the flanges on the annular cushions 9 firmly grip the sides of the cushion member 14. It is evident that while the flanges tightly grip the sides of the member 14, yet they permit that member to have a limited amount of radial yielding movement and do not impair its resilience. It is thus seen that by adjusting the circular flanges 3 and 4 toward or from each other by means of the bolts 11 a greater or less degree of resilience will be permitted, and that the amount that the tire will yield under a load may be controlled to some extent by the adjustment of the nuts 12 and 13.

While I have shown a specific construction for the circular flanges 3 and 4, it will be understood that I do not desire to confine my invention to this particular construction, since the same result may be attained by other means which are well known at the present time, and any suitable means for effecting the lateral adjustment of the members 9, I consider to be within the spirit of my invention.

By the means above described, I have produced a tire which has the advantages of the ordinary solid tire and has in addition the capacity for being adjusted to give greater or less degree of resilience, as the user may desire.

Having thus fully described my invention, what I claim and desire to secure by Letters Patent is:

1. In a tire, the combination with a felly, of an inner circular rim of resilient material, the inner face of said rim formed with annular grooves, an annular cushion of L-shaped cross section located at each side of said resilient rim, a pair of oppositely disposed circular flanges of angular cross section mounted upon said felly and carrying said inner resilient rim, adjusting bolts passing through said circular flanges and through said annular cushions, a main cushion member received between said L-shaped annular cushions, said member formed with inwardly projecting rims, said rims formed with perforations to loosely receive said bolts, and laterally extending edges formed on said main cushion member and bearing against the outer peripheries of said L-shaped annular cushions, for the purposes set forth.

2. In a tire, the combination with a felly, of an inner circular rim of resilient material, an annular cushion of L-shaped cross section located at each side of said resilient rim, a pair of circular flanges adjustably mounted on said felly, means for adjusting said flanges toward each other, a main cushion member received between said L-shaped cushions, said member formed with inwardly projecting rims adapted to bear against the outer periphery of said inner circular rim, and laterally extending edges formed on said main cushion member, said edges bearing against the outer peripheries of said L-shaped annular cushion, for the purpose set forth.

3. In a tire, the combination with a felly, of an inner circular rim of resilient material, an annular cushion of substantially L-shaped cross section located at each side of said rim, a pair of circular flanges adjustably mounted on said felly, means for adjusting said flanges toward each other, a main cushion member adapted to be clamped between the inwardly projecting flanges of said L-shaped cushions, said cushion member adapted to bear against the said inner circular rim, for the purposes set forth.

In testimony whereof, I affix my signature in presence of two witnesses.

HERMAN BESSER.

Witnesses:
JOSEPH H. COBB,
MARGARET MCDONALD.

Copies of this patent may be obtained for five cents each, by addressing the "Commissioner of Patents, Washington, D. C."